United States Patent Office 3,594,120
Patented July 20, 1971

3,594,120
ANHYDROUS MAGNESIUM CHLORIDE
Lawrence L. Bott, Oak Park, Ill., and Richard L. Craig, Edward A. Hunter, and Evan A. Mayerle, Lake Jackson, Tex., assignors to Nalco Chemical Company, Chicago, Ill.
No Drawing. Filed Dec. 23, 1968, Ser. No. 786,394
Int. Cl. C01f 5/30
U.S. Cl. 23—91  5 Claims

ABSTRACT OF THE DISCLOSURE

In the so-called "Nalco-Freeport" process for the production of organolead compounds by the electrolytic decomposition of a sacrificial lead anode utilizing a mixture of anhydrous oxygenated solvents consisting preferably of the diethylether of tetraethylene glycol (DETEG) and tetrahydrofuran (THF) in the operable ratio 25–50/75–50; a preferred ratio of 30–40/70–60 and an optimum value of 35/65 by weight percent, with the consequent byproduction of anhydrous magnesium chloride ($MgCl_2$), the step and improvement which consists of separating and recovering magnesium values by treatment of the $MgCl_2$ with anhydrous ammonia to form a magnesium chloride ammine complex precipitate ($MgCl_2 \cdot XNH_3$, where X=1–6), separating the ammine complex from the solvent mix and decomposing the ammine under water-free muffled conditions by heating at 300°–400° C. for 10–16 hours to drive off the ammonia and recovering the consequent freed anhydrous $MgCl_2$.

---

In the early 1960's, a new process for the production of organolead compounds was invented and made commercially practicable at the Nalco-Freeport, Texas, U.S.A., plant of the Nalco Chemical Company, and has come to be termed the "Nalco-Freeport" process. Cf. Kirk-Othmer II, The Encyclopedia of Chemical Technology, volume 12, pages 292–293 (1967). Differing from prior art processes, this new process used a sacrificial lead anode with anhydrous magnesium Grignard reagent and excess alkyl halide as input according to the overall equation given below for tetramethyl lead:

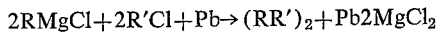

The process may be generalized as follows:

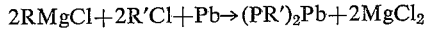

where R and R' are preferably lower alkyl, alkylene, and the like. R and R' may be similar as with the production of tetramethyl lead or dissimilar to produce mixed organolead compounds, as for example dimethyldivinyllead. R is usually termed the organo Grignard substituent and R' is usually termed the scavenger substituent.

In a similar fashion to tetramethyl lead above, tetraalkyl lead, mixed alkyls such as the dimethyldiethyl variety and mixed alkylenes such as diethyldivinyl lead may be produced. In general, the lower molecular weight substituents (1. m.w.) where C=1–3 have been found most useful for antidetonate compositions in gasoline.

The Nalco-Freeport process had the great advantage of utilizing lead in its entirety as the sacrificial anode where prior art used only a part of the lead, but a commercial problem remained in that the magnesium chloride byproduct provided difficulties in separation. Also, since the magnesium was more costly than the sodium utilized by competitive processes, it was important to fully utilize the $MgCl_2$ byproduct to make the process commercially competitive. The equation goes to the right with the absence of magnesium interference due to excess alkyl halide introduced to recombine with any magnesium side reaction, and the patent position in part as to this process is illustrated by the following patents:

U.S. 3,007,858—Braithwaite (Nalco)
U.S. 3,380,899—Braithwaite et al. (Nalco)
U.S. 3,393,137—Altman et al. (Nalco)

The permissible anhydrous solvent solution utilized in the present invention includes and incorporates by reference those solvents delineated at column 6, lines 14 through 36 of U.S. 3,007,858 ante.

In addition to the Nalco assigned patents noted above, the patented art believed most pertinent to the present invention is as follows:

U.S. 2,381,995—Belchetz. This expired art patent teaches the separation of anhydrous magnesium chloride in a solution of an anhydrous monohydroxy saturated aliphatic alcohol by the addition of anhydrous ammonia. This art can be distinguished from the present development by the divergence of solvent and the setting of the invention. Further, a routineer in the art would be led away from Belchetz because organometallic compounds such as the Grignard reactants in the present overall process cannot be used in hydrolytic solvents such as alcohols which give an "active hydrogen" reaction with the present magnesium Grignard reagent (cf. Cram and Hammond: Organic Chemistry (1964), page 262).

U.S. 3,014,780—Clarke—eaches the liberation of ammonia from magnesium chloride hexammoniate with the addition of magnesium to counteract corrosion.

U.S. 3,347,626—Nightingale—deals with an aqueous system rather than the non-aqueous system of the present invention.

Later development in this field showed that commercially the optimum anhydrous solvent was a mixture of ethers and of these a synergistic combination of a glycol/oxycyclic mix of DETEG/THF was found to show increased efficiency as to organolead production. It was also found that for the best results the following ratios should be observed as to the weight per cent of DETEG/THF: an operable ratio of about 25–50/75–50; a preferred ratio of about 30–40/70–60, and an optimum value of about 35/65.

However, it was found that the problem of separating the magnesium chloride byproduct from the ether solvents in the effluent from the electrolytic cell was still a major stumbling block for commercial competition with other processes. It has now been found that the recovery of the magnesium chloride may be achieved in this process by treatment of the anhydrous ether solvent mix with anhydrous ammonia, and subsequent removal of ammonia from the ammine by heating under muffled or closed conditions in a water-free atmosphere at about 300° C.–400° C. for 10–16 hours. A preferable water-free or anhydrous atmosphere is produced by utilizing an inert gas such as nitrogen, helium or argon. The gas product showed that the ammonia combination was in the ratio of 3.5–4:1

NH₃/MgCl₂, showing a probable mixture formation of the preferred hexammoniate coupled with amounts of the lower ammines prior to heating.

The results also indicated that the anhydrous magnesium chloride could be recovered from the electrolyzed cell effluent with 99+% efficiency by the treatment with anhydrous ammonia.

Further, the formation reaction of MgCl·XNH₃ is not violent but a significant amount of heat is liberated. The ammine product obtained was crystalline and easily filtered and washed. Residual organolead product was removed from the filter cake readily by washing with THF. Also, the mixed ether filtrate does not appear to retain or absorb free ammonia with any tenacity.

EXAMPLE 1

To an anhydrous effluent from an electrolytic cell producing tetramethyl lead by the Nalco-Freeport process comprising 100 mols of anhydrous magnesium chloride, 350 mols of anhydrous ammonia were added and taken until precipitation was complete (1×10⁻⁴% Mg. in filtrate). After a period of time, additional anhydrous NH₃ was added to the system, so that approximately 400 mols of ammonia total were utilized as reactant, and the end point was noted by lack of NH₃ takeup and lack of temperature rise.

The precipitate was filtered with vacuum and washed six times with equal volumes of dry THF, vacuum filtering to a compact cake after each wash. The final cake was then dried in a vacuum desiccator pumping through a Dry Ice trap and analyzed.

Samples of the dry product analyzed with the following results summarized below:

TABLE 1

| Analysis | Number of analyses | Weight percent, average | Weight percent, range |
|---|---|---|---|
| Mg | 5 | 14.6 | 13.9–15.5 |
| Cl | 5 | 41.8 | 39.5–44.1 |
| NH₃ | 5 | 46.6 | 43.6–48.3 |
| Total percent | 5 | 103.0 | 99.9–106.3 |
| Mg/Cl ratio, weight | 5 | 0.35 | *0.35 |
| NH₃/Mg ratio, mol | 5 | 4.5 | 4.2–4.9 |

*MgCl₂=0.34.

EXAMPLE 2

A portion of the ammine product from Example 1 was transferred to a muffle furnace and an anhydrous atmosphere and heated step-wise to decompose and release the ammonia. Formation of the precipitate by analysis and by literature reports forms preferentially the hexammoniate ammine, MgCl₂·6NH₃. On heating it was found that the following reactions appear to occur: at 90° C.,

6NH₃→4NH₃ at 130° C., 4NH₃→2NH₃; at 300° C., 2NH₃ gives 1NH₃ and 0NH₃.

It was observed that a heat change product believed to be magnesium chloride hexammoniate decomposed at about 90° C. and the change from the tetrammoniate to the diammoniate occurred at about 130° C., and finally the freeing of the magnesium chloride entirely from the ammonia occurred in the range 300° C.–400° C. after a period of twelve hours' heating at the latter range.

EXAMPLE 3

A Grignard solution was electrolyzed in an electrolytic cell of the type described in U.S. Pat. 3,393,137, Altman et al., using excess organic halide. In this case, the product manufactured was tetramethyl lead and the input of lead was 1500 parts, magnesium 399 parts and methyl chloride 2424 parts. Prior to electrolysis the magnesium and the methyl chloride were reacted in cosolvents consisting of THF and DETEG to give a solution of methyl magnesium chloride containing a slight excess of methyl chloride. The electrolysis was carried out at a temperature of 120° F. 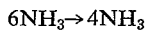 and the average current density of 23 amperes per square foot until a very small amount (0.06 millimole per gram of solution) of methyl magnesium chloride remained. The effluent from the electrolytic cell comprised 270 parts methyl chloride, 5500 parts THF, 2300 parts tetramethyl lead, 2310 parts DETEG and 1500 parts magnesium chloride. A stripping tower, designated E–1A, removed 260 parts of the carryover methyl chloride together with 2000 parts of THF. The effluent from the stripping tower E–1A, designated E–1A bottoms, was then passed into a mixing chamber. Anhydrous NH₃ gas was passed through and thoroughly mixed with the effluent until the reaction was substantially complete, evidenced by lack of further precipitation as the granular precipitate collecting at the bottom of the vessel. Subsequently, the precipitate was filtered and washed with THF to remove DETEG and the THF was then essentially removed (less than 1% by weight) with vacuum at room temperature, indicating there was little or no complexing of the THF ether by the ammine.

Analysis indicated that slightly less than 4 mols of NH₃ per mol of MgCl had been reacted to form the ammine precipitate. The precipitate, averaging MgCl₂·4NH₃, but probably comprising a good percentage of hexammoniate, was removed and placed in a large dry box to insure the absence of water.

Additional ammonia was added to the system to check the completion of the reaction and the gas analysis and temperature readings indicated that the reaction was complete. The precipitate was vacuum filtered and then given six washings with equal volumes of dry THF vacuum filtering to a compact cake after each wash. The final cake was then dried in a vacuum desiccator pumping through a Dry Ice trap.

The precipitate was heated for 16 hours at about 400° C. and analyzed. The analysis in weight percent was as follows:

Mg, 26.6; Cl, 63.7; NH₃, nil; N, <0.2; C, 0.22.

In other experiments involving the E–1A feed, including the alkyl halide constituent as well as E–1A bottoms wherein the alkyl halide had been largely removed, it was found that the results were similar in eliminating and recovering the MgCl₂ byproduct from the system. In the case of the heavier bottoms, it was occasionally deemed advisable to increase the percentage of THF ratio in order to keep the mass fluid.

The embodiments of the invention in which an exclusive property or privilege is claimed are defined as follows:

1. In the electrolytic production of organolead compounds from a magnesium Grignard reagent, excess aliphatic halide and a sacrificial lead anode, producing an organolead product and an effluent byproduct comprising magnesium chloride in a non-aqueous mixed ether solvent effluent consisting of a mixture of the diethylether of tetraethylene glycol and tetrahydrofuran in a ratio of about 25–50/75–50 by weight percent, the step which consists of treating said effluent with anhydrous gaseous ammonia to precipitate the magnesium chloride byproduct as magnesium chloride ammine (MgCl₂·XNH₃ where X=1–6), and freeing said ammine precipitate of ammonia by heating in a closed anhydrous atmosphere provided by an inert gas selected from nitrogen, helium and argon at a temperature of about 300° C–400° C. for about 10–16 hours.

2. The process according to claim 1 wherein the non-aqueous mixed ether solvent is a mixture of the diethylether of tetraethylene glycol and tetrahydrofuran in the ratio of about 30–40/70–60 by weight percent.

3. The process according to claim 1 wherein the non-aqueous mixed ether solvent is a mixture of the diethylether of tetraethylene glycol and tetrahydrofuran in the ratio of about 35–65 by weight percent.

4. The process according to claim 1 wherein said magnesium chloride ammine precipitate is freed of ammonia by heating said precipitate in a closed anhydrous atmosphere at a temperature of about 400° C. for 12 hours.

5. The process according to claim 1 wherein the anhydrous atmosphere is provided by nitrogen.

References Cited

UNITED STATES PATENTS

| | | | |
|---|---|---|---|
| 2,381,995 | 8/1945 | Belchetz | 23—91 |
| 3,092,450 | 6/1963 | Christensen et al. | 23—91 |
| 3,341,282 | 9/1967 | Kimberlin, Jr. et al. | 23—91 |
| 3,345,128 | 10/1967 | Nightingale, Jr. | 23—91 |
| 3,347,626 | 10/1967 | Nightingale, Jr. | 23—91 |
| 3,352,634 | 11/1967 | Buchmann | 23—91 |
| 3,380,900 | 4/1968 | Braithwaite et al. | 204—59 |

EDWARD STERN, Primary Examiner

U.S. Cl. X.R.

23—356; 204—59

UNITED STATES PATENT OFFICE
CERTIFICATE OF CORRECTION

Patent No. 3,594,120  Dated July 20, 1971

Inventor(s) Lawrence L. Bott et al.

It is certified that error appears in the above-identified patent and that said Letters Patent are hereby corrected as shown below:

Column 1, line 45, "$2RMgCl + 2R'Cl + Pb \rightarrow (RR')_2 + Pb2MgCl_2$"

should read -- $2 CH_3MgCl + 2 CH_3Cl + Pb \rightarrow (CH_3)_4 Pb + 2 MgCl_2$ --;

line 49, "$(PR')_2Pb$" should read -- $(RR')_2Pb$ --.

Signed and sealed this 27th day of June 1972.

(SEAL)
Attest:

EDWARD M. FLETCHER, JR.
Attesting Officer

ROBERT GOTTSCHALK
Commissioner of Patents